(12) United States Patent
Hwang et al.

(10) Patent No.: US 10,397,209 B2
(45) Date of Patent: Aug. 27, 2019

(54) RISK-AWARE MULTIPLE FACTOR AUTHENTICATION BASED ON PATTERN RECOGNITION AND CALENDAR

(71) Applicant: International Business Machines Corporation, Armonk, NY (US)

(72) Inventors: Jinho Hwang, Yorktown Heights, NY (US); Clifford A. Pickover, Yorktown Heights, NY (US); Maja Vukovic, Yorktown Heights, NY (US); Frederick Y. Wu, Yorktown Heights, NY (US)

(73) Assignee: International Business Machines Corporation, Armonk, NY (US)

(*) Notice: Subject to any disclaimer, the term of this patent is extended or adjusted under 35 U.S.C. 154(b) by 123 days.

(21) Appl. No.: 15/643,372

(22) Filed: Jul. 6, 2017

(65) Prior Publication Data
US 2019/0014097 A1 Jan. 10, 2019

(51) Int. Cl.
| | | |
|---|---|---|
| G06F 21/34 | (2013.01) | |
| H04L 29/06 | (2006.01) | |
| G06F 21/35 | (2013.01) | |
| G06F 21/36 | (2013.01) | |

(52) U.S. Cl.
CPC .................... H04L 63/08 (2013.01)

(58) Field of Classification Search
CPC ..... H04L 63/08; H04L 63/083; H04L 63/102; H04L 29/06
USPC .......................................................... 726/7
See application file for complete search history.

(56) References Cited

U.S. PATENT DOCUMENTS

| | | | |
|---|---|---|---|
| 8,126,922 B2 | 2/2012 | Holzapfel et al. | |
| 8,316,237 B1* | 11/2012 | Felsher | H04L 9/0825 380/282 |
| 8,844,005 B2 | 9/2014 | Jakobsson et al. | |
| 8,984,605 B2 | 3/2015 | Bauckman et al. | |
| 9,078,129 B1 | 7/2015 | Dotan et al. | |
| 9,118,656 B2 | 8/2015 | Ting et al. | |
| 9,407,619 B2 | 8/2016 | Tunnell et al. | |
| 9,407,754 B1* | 8/2016 | Benoit | H04M 1/72577 726/5 |
| 9,485,237 B1* | 11/2016 | Johansson | H04L 63/08 726/5 |
| 9,813,402 B1* | 11/2017 | Chen | G06F 21/316 726/5 |
| 2008/0103972 A1* | 5/2008 | Lanc | G06Q 20/32 705/44 |
| 2012/0069131 A1* | 3/2012 | Abelow | G06Q 10/067 348/14.01 |
| 2013/0198818 A1* | 8/2013 | Hitchcock | H04L 63/08 726/5 |

(Continued)

Primary Examiner — Haresh N Patel
(74) Attorney, Agent, or Firm — Cahn & Samuels, LLP

(57) ABSTRACT

An embodiment of the invention provides a system and method for risk-aware multiple factor authentication based on pattern recognition and calendar. Recent activity performed by the user can be obtained from data sources and stored in a user transaction database. An interface can receive a login name from a user; and, a processor can select one or more security questions regarding the recent activity performed by the user. The interface can receive an answer to the security question(s) from the user; and, the processor can determine whether the answer(s) matches data stored in the user transaction database and is associated with the login name of the user.

22 Claims, 12 Drawing Sheets

(56) References Cited

U.S. PATENT DOCUMENTS

| | | | |
|---|---|---|---|
| 2013/0198824 A1* | 8/2013 | Hitchcock | G06F 21/00 726/6 |
| 2015/0302252 A1* | 10/2015 | Herrera | G06K 9/00617 382/117 |
| 2015/0347787 A1 | 12/2015 | Hamilton et al. | |
| 2016/0110528 A1* | 4/2016 | Gupta | G06F 21/31 726/19 |
| 2017/0041296 A1* | 2/2017 | Ford | H04L 63/0421 726/5 |
| 2017/0289168 A1* | 10/2017 | Bar | H04L 63/0853 726/5 |
| 2018/0033009 A1* | 2/2018 | Goldman | G06Q 20/4016 726/5 |
| 2018/0219859 A1* | 8/2018 | Grunin | H04L 63/0838 726/5 |

\* cited by examiner

| | Wednesday Oct 26 | Thursday Oct 27 | Friday Oct 28 |
|---|---|---|---|
| 8:00 | Briefing | Briefing | Briefing |
| 9:00 | ~~Write press release~~ | | Meeting with J. Doe |
| 10:00 | Presentation | | Meeting with J. Smith |
| 11:00 | | | |
| 12pm | | Conference | |
| 1:00 | Meeting with J. Smith | | Teach new employees |
| 2:00 | | | |
| 3:00 | | | |
| 4:00 | | | |
| 5:00 | | | |

FIG. 1

| Data Provider | Query | Recent Query Count | Correct Responses | Accuracy | Rank |
|---|---|---|---|---|---|
| Shopping Website | Most recent purchase<br>One of three recent purchases | 4<br>3 | 2<br>3 | 0.50<br>1.00 | 4<br>1 |
| Social Media Website | Most recently viewed profile<br>Type of recent post<br>Date of most recent post | 12<br>7<br>2 | 9<br>2<br>2 | 0.75<br>0.28<br>1.00 | 2<br>6<br>1 |
| Calendar | Persons in yesterday's meetings<br>Current favorite icon | 9<br>4 | 6<br>2 | 0.67<br>0.5 | 3<br>4 |
| Bank | Major purchase item<br>Major purchase vender | 4<br>8 | 2<br>3 | 0.50<br>0.38 | 4<br>5 |
| Electronic tolls | Recent toll charge location<br>Date of recent toll charge | 3<br>4 | 2<br>3 | 0.67<br>0.75 | 3<br>2 |
| Cell Phone provider | Recent locations visited | 9 | 2 | 0.22 | 7 |
| Content provider | Last watched video | 6 | 6 | 1.00 | 1 |
| Music provider | Favorite new song | 5 | 5 | 1.00 | 1 |

FIG. 6

Login ID

To help us verify your identity, please answer these questions:

Whose facebook profile did you recently view?

What purchase did you recently make at Store X?

Please name someone on your meeting calendar yesterday afternoon

These additional questions may appear if any of the initial questions were answered incorrectly.

What was the last toll bridge you drove across?

What is the last song you purchased on Music Website?

FIG. 7

RISK-AWARE MULTIPLE FACTOR AUTHENTICATION BASED ON PATTERN RECOGNITION AND CALENDAR

FIELD OF THE INVENTION

The present invention relates to systems, methods, and computer program products for risk-aware multiple factor authentication based on pattern recognition and calendar.

BACKGROUND

Device authentication refers to the testing of an identity of an end user of a device to ensure proper authorization of the end user to access the device. Traditional methods of performing device authentication include general password authentication in which an end user submits in response to a prompt a predetermined password in order to gain access to the device. More advanced forms of password authentication involve the submission of any combination of a user identifier, private key or passphrase in addition to one or more answers to one or more corresponding challenge questions. Even more advanced modes of device authentication involve biometric analysis in which the finger print, voice print or iris scan of an end user can be compared to a pre-stored print in order to assure the authorized access of a submitting end user.

SUMMARY OF THE INVENTION

An embodiment of the invention provides a system and method for risk-aware multiple factor authentication based on pattern recognition and calendar. Recent activity performed by the user can be obtained from data sources and stored in a user transaction database. An interface can receive a login name from a user; and, a processor can select one or more security questions regarding the recent activity performed by the user. The interface can receive an answer to the security question(s) from the user; and, the processor can determine whether the answer(s) matches data stored in the user transaction database and is associated with the login name of the user.

In at least one embodiment of the invention, an accuracy score is determined for each security question answered by the user, and the security questions are ranked based on the accuracy scores. It can be determined whether a state of the user is impaired; and, an impaired security question can be selected when the cognitive state of the user is impaired. The impaired security question can have an accuracy score below a predetermined threshold.

BRIEF DESCRIPTION OF THE SEVERAL VIEWS OF THE DRAWINGS

The present invention is described with reference to the accompanying drawings. In the drawings, like reference numbers indicate identical or functionally similar elements.

FIG. 1 illustrates an electronic calendar of a user according to an embodiment of the invention.

FIG. 6 illustrates an authentication result datastore according to an embodiment of the invention.

FIG. 7 illustrates a user interface according to an embodiment of the invention.

DETAILED DESCRIPTION

Figure 2:
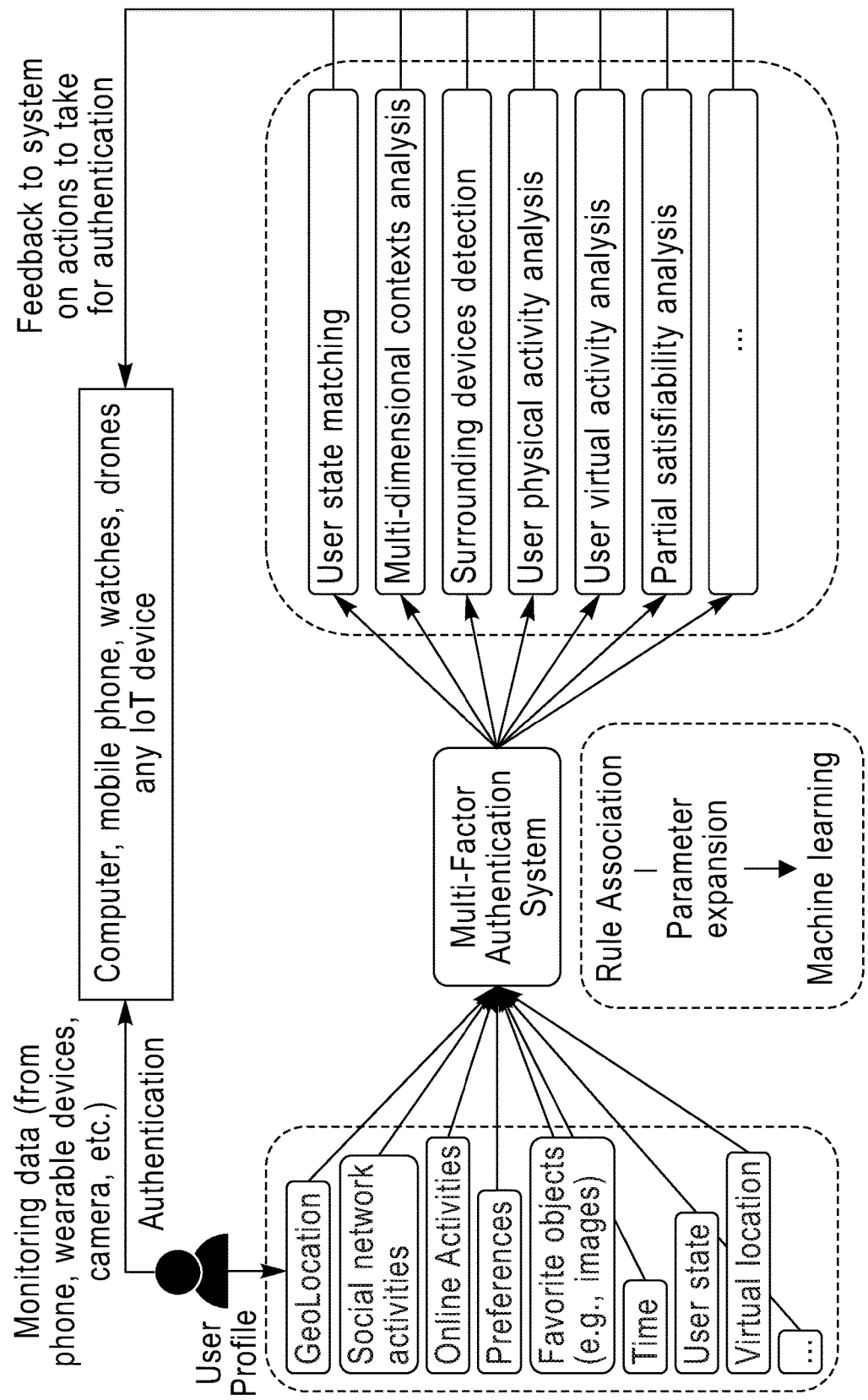
FIG. 2 is a diagram illustrating a system architecture overview showing the entire end-to-end flow according to an embodiment of the invention.

Exemplary, non-limiting, embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

At least one embodiment of the invention provides a system and method for user authentication using multiple dynamic information tokens. The system can employ recent history of user transactions and personal preferences to verify the identity of the user. The system may dynamically adapt the type of transactions to be used based on the user context (e.g., location, situation, website) and cognitive state (e.g., accessibility requirements, distraction, fatigue). Examples of questions inquiring as to the user "situation" include "Who did you talk at 1:00 PM on the phone yesterday?", "Who did you have a lunch with yesterday?", "Where was your 10:00 AM meeting on Monday?" The system can determine a user's accessibility requirements, such as, for example, his ability to answer with voice, actions, touches, etc. For instance, it may be difficult to answer questions in text while driving.

In at least one embodiment of the invention, the system can determine the user context and cognitive state by monitoring the activities of the user through various tools, such as, for example, a camera (e.g., in cell phone, laptop, monitor, dashboard), GPS, Gyroscope, and other sensors. The camera can be very useful to read the facial expression. For example, a user may be distracted if his eyes are moving from place to place on a screen, or drifting off the screen, as determined by eye-tracking sensors. A person may be distracted if multiple windows are being used at once, while he or she is on the phone. Other aspects of a user's cognitive characteristics may be specified in a user profile.

Moreover, the system can learn strengths and weaknesses of the user's memory, and can discover the most suitable types of query to use. When using personal preferences such as images, the system may rely on pattern matching and/or similarity assessment as means of evaluating user's responses as part of the authentication process. In one embodiment for "out-of-band authentication," a user's electronic calendar is employed.

In at least one embodiment, the system includes a repository of user's transactions that is shared by the user. The repository can be maintained by an online service that retrieves the user's transaction history from external sites. The system can include a component that dynamically generates authentication questions based on user context and cognitive state and a learning component that learns about the user's memory capabilities and preferences (and learning about cohorts of users). The system can include a pattern matching component that allows for partial satisfiability in question responses and a calendar interface component that accesses and marks regions of the user's electronic calendar.

More specifically, for "out-of-band authentication," as an initial step, the user can specify one or more days of the calendar year in which the user will embed certain authentication content in the user's calendar, which can be used for additional authentication. If desired, for privacy and security reasons, much of the other calendar content may be 100% shielded from view from the authentication system.

For example, a user enters "Meeting with John Smith" on October 28th at 10:00 AM of his calendar. Other similar kinds of information may exist as useful information, or even as decoys, on selected other days that are accessible to the authentication system, for example, on Christmas day and the user's birthday. The authentication process may then access the user's calendar for the authentication content and note "Meeting with John Smith," which may be on the calendar purely for the purposes of authentication (i.e., not an actual scheduled meeting). Thus, the authentication process may ask the user about this information, allowing the user a convenient means in which to provide both authentication information and decoy information.

Many people use electronic calendars and can readily provide information via this mechanism, which has a graphical user interface (GUI) that many people are familiar with. An electronic calendar can include authentication content on one or more special days and times that can be made accessible to the authentication system. The authentication system can access a user's actual calendar or a secondary calendar setup for the sole purpose of holding authentication content and decoy content. In at least one embodiment, the electronic calendar can include images or symbols (e.g., smiley face, birthday cake, balloons, heart, paw print, flag, telephone, airplane) embedded on certain days of the year that may serve as additional means of authentication and authentication queries. The electronic calendar can include authentication content or decoy content that is stored in a "To Do" or "Tasks" list.

In at least one embodiment, the system displays event data via a default calendar to guest users (the authentication system). In another embodiment, a customized calendar displays events based on contextual relationships and based on the viewing history of the authentication service, including the number of times that the authentication service requests authentication, and for a particular purpose of authentication, and other input data from the user. The calendar approach is a technique that involves authenticating a user requesting access using knowledge-based authentication (KBA) questions generated based on the calendar entries, which may be real or specially designed to be accessed by the authentication service. The authentication service may leave a mark on the calendar each time it is attempting to authenticate a user.

The user may provide image contextual information for the authentication service using a drag-and-drop interface for photos, icons, pictures, symbols and the like. For example, as illustrated in FIG. 1, a butterfly symbol is dragged to and dropped on a calendar entry labelled "conference", and a decoy beetle symbol is dragged to and dropped on a calendar entry labelled "teach new employee". For authentication, the user may know that his special icon is butterfly, and October 27 is the date that the authentication service will query. Such symbols may be toggled on and off, so they need not actually obscure the calendar full time.

Examples of other kinds of authentication factors include: recent online purchases; recent and current geolocation (e.g., obtained from mobile phone, vehicle transponder, IP address, etc.); recent social media activity; favorite images (e.g., either provided at registration or profile setup, or from social media sites); images related to personal interests (e.g., sports, animals, scenery) provided at registration, profile setup, and/or from social media sites. Prior consent to disclosure may be required for some or all of the authentication factors.

People tend to think contextually, so the system may take a user into the time or context when a certain transaction was made and can provide the user with some clues to help with authentication. A high dimensional array may be employed to capture various contextual parameters such as, location (physical), location virtual (URI), time, social sending, transaction history, etc. Parameters may be learned over time as the system learns about the user.

The system can also learn about the devices that a user commonly uses and is surrounded by. For example, a question may be routed to an internet of things (IoT) device in the user's vicinity requesting an authentication. The system can also consider users with accessibility needs, and can learn what works for each user in a given context.

FIG. 2 is a diagram illustrating a system architecture overview showing the entire end-to-end flow according to an embodiment of the invention. A user profile can include data, such as geolocation, social network activities, online activities, preferences, favorite objects (e.g., images), time, user state (e.g., mood and emotion), and/or virtual location. Data from the user profile can be input into a multi-factor authentication system, which can relate authentication parameters in the data by performing user state matching, multi-dimensional contexts analysis, detecting surrounding devices, user physical/virtual activity analysis, and/or partial satisfiability analysis. The system can then feedback to devices where the authentication methods can be performed with the best authentication approach. The user may be authenticated with different ways depending on the analysis.

At least one embodiment of the invention provides a system that includes authentication device(s), a user context detection and cognitive assessment module, and an electronic calendar with information used for authentication purposes. The context sensing features can increase the confidence level C for user authentication, such that the authentication can enable or require additional multi-factor authentication. The features being sensed can include the user's nearby devices (and devices of people in their social network) and/or the user's cognitive state (e.g., tired, colorblind, accessibility needs, etc.). The system may partially satisfy the authentication requirement based on the user's state; and, the system can learn about the most suitable authentication methods given the user context and cognitive state.

In at least one embodiment of the invention, based on user input information, the system finds related elements using associated rule learning. An apriori algorithm can use a breadth-first search strategy to sweep through the states and can use a candidate generation function, which can exploit the downward closure property of support. In a join step, $C_k$ can be generated by joining $L_{k-1}$ with itself, where $C_k$ can be a candidate itemset of size k, and where $L_k$ can be a frequent itemset of size k. In a prune step, any (k−1)-itemset that is not frequent cannot be a subset of a frequent K-itemset. For example, a user is home, browsing an online shopping website, and excited. The system can determine that the user state is pleasant, in front of a monitor so information can be received, and the user can answer questions.

In at least one embodiment, action classification is performed with a multi-labeled support vector machine (SVM). Inputs can include a labeled Set $D_1$, an unlabeled Set Du, a number of steps T, and/or a number of examples per iteration S.

Figure 3:
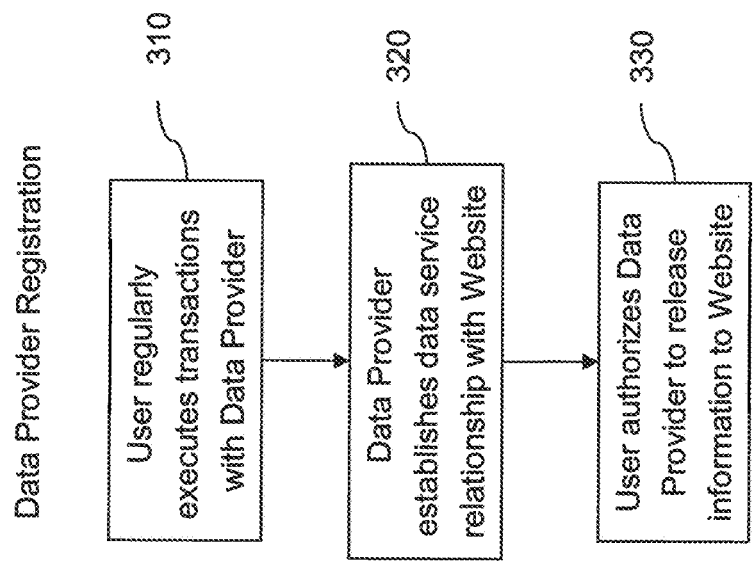
FIG. 3 is a flow diagram illustrating a method of data provider registration according to an embodiment of the invention.

FIG. 3 is a flow diagram illustrating a method of data provider registration according to an embodiment of the invention. A data provider registration process can include a user regularly executing transactions with one or more data providers 310. A data provider can be the entity that possesses the user's activity history and establishes a data service relationship with a website to provide this information to the website as a service 320. The user can authorize the data providers to provide data to specific websites for purposes of authentication 330.

Figure 4:
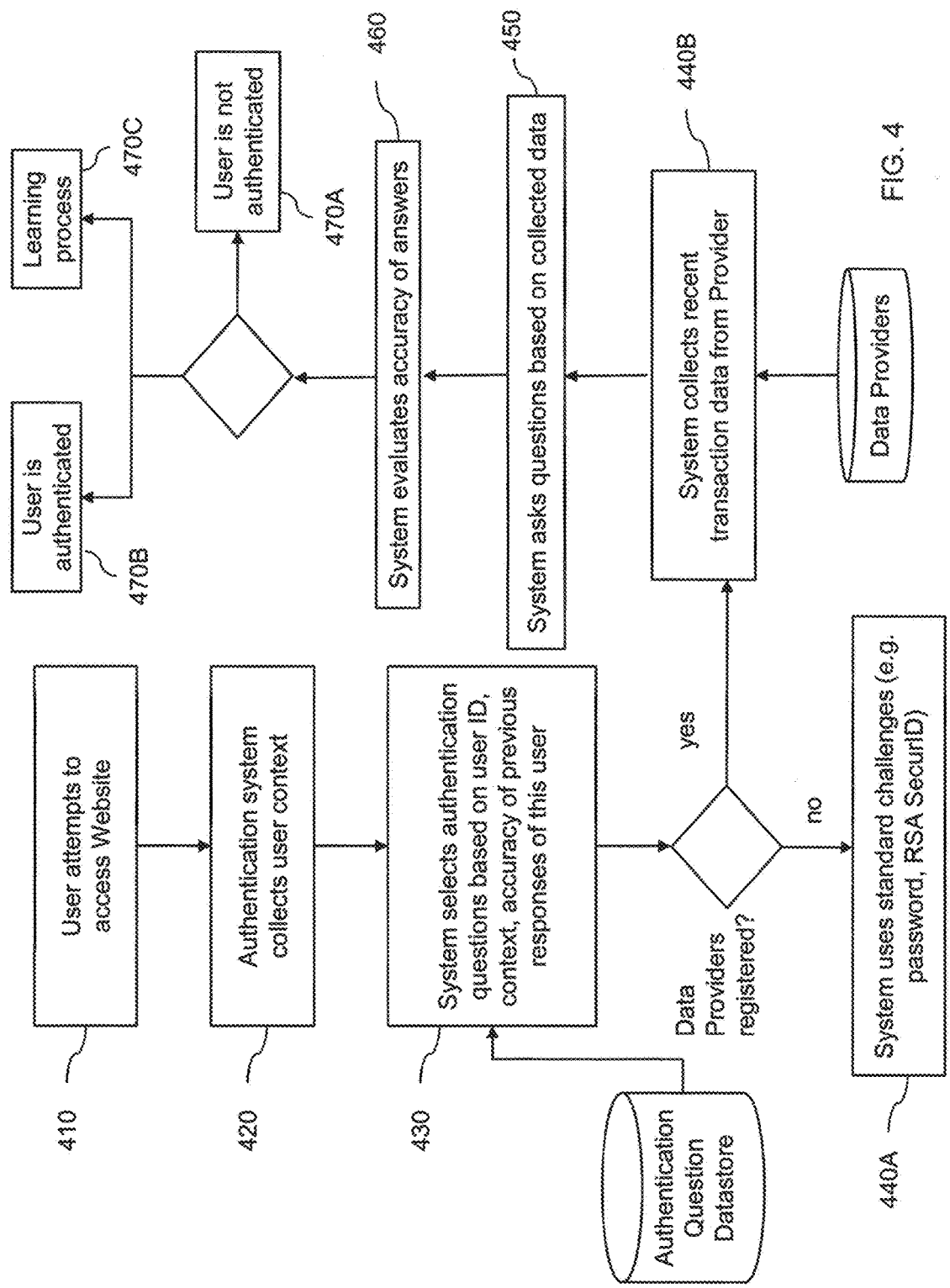
FIG. 4 is a flow diagram illustrating a method of user authentication by a website according to an embodiment of the invention.

FIG. 4 is a flow diagram illustrating a method of user authentication by a website according to an embodiment of the invention. User authentication by the website can include the user attempting to access the website 410 and the authentication system collecting user context 420. The user context can include the location of the user, the time of day, and/or the online availability of resources (e.g., calendar, other users, IoT devices, etc.). Configuration parameters can include the number of hour or days in the user's history to query (can be age dependent), the number of incorrect answers to tolerate per question, the overall number of incorrect answers to tolerate for an authentication attempt, and/or the number of correctly answered questions required for authentication. The system can select authentication questions from an authentication question datastore based on the user ID, context, and/or accuracy of previous responses of the user 430.

If the data provider is not registered with the system, then the system can use standard challenges (e.g., password, RSA SecurID) 440A. If the data provider is registered with the system, then the system can collect recent transaction data from the data providers 440B. The system can ask questions based on the collected data 450 and evaluate the accuracy of the answers 460. If a threshold number of questions are answered incorrectly, the user is not authenticated 470A. If a threshold number of questions are answered correctly, the user is authenticated 470B and a learning process continues 470C.

Figure 5:
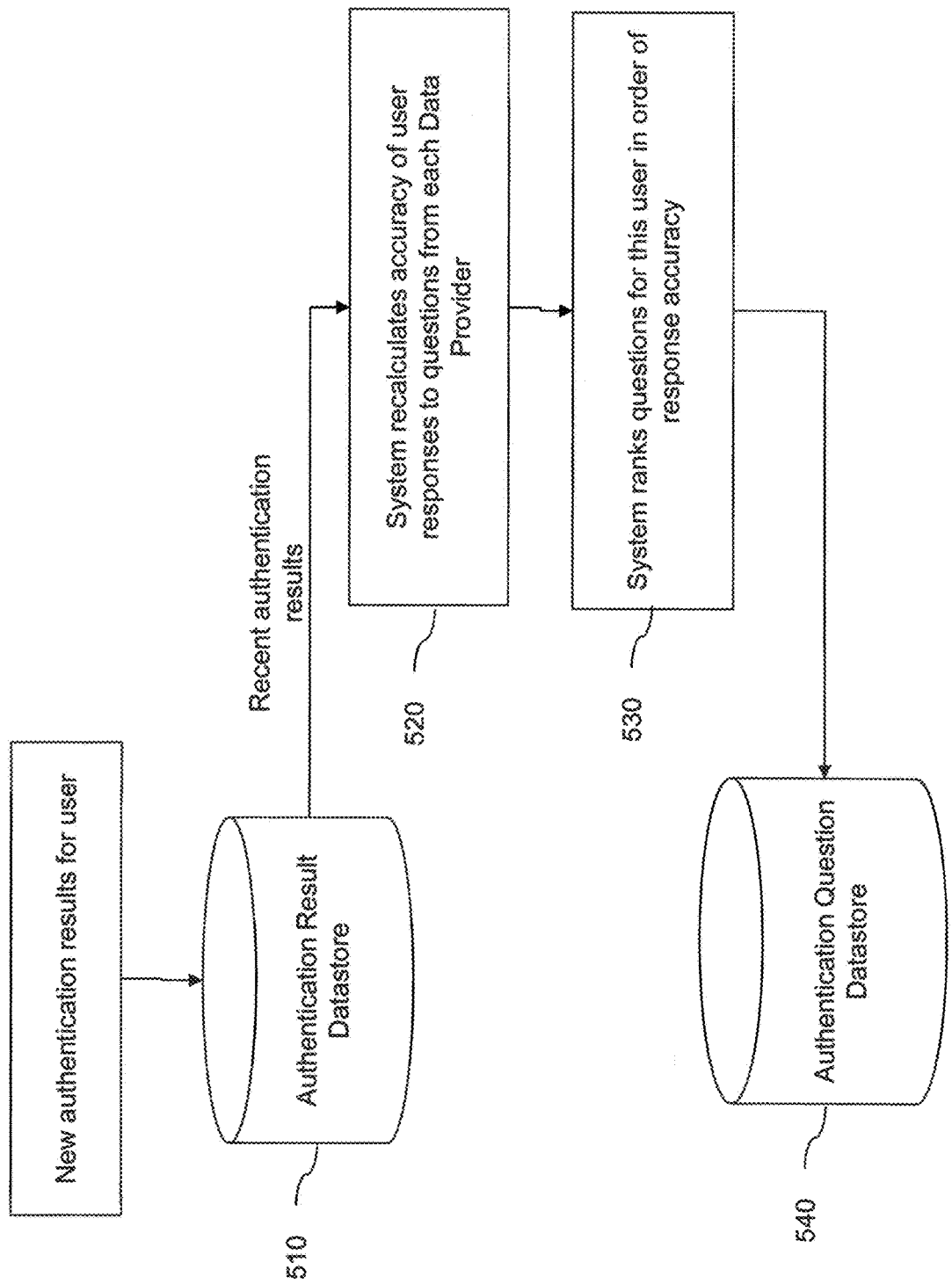
FIG. 5 illustrates a learning process according to an embodiment of the invention.

FIG. 5 illustrates a learning process according to an embodiment of the invention, where new authentication results for the user are received in an authentication result datastore 510. A sample authentication result datastore is illustrated in FIG. 6 where one or more queries (also referred to herein as "security questions") are listed for each data provider. The authentication result datastore can include the recent query count, correct responses, accuracy, and rank for each query. The system can use the recent authentication results to recalculate the accuracy of user responses to queries from each data provider 520; and, the system can rank queries for this user in order of response accuracy 530.

The rankings can be stored in the authentication question datastore 540. FIG. 7 illustrates a sample user interface according to an embodiment of the invention, which includes five security questions.

Figure 8:
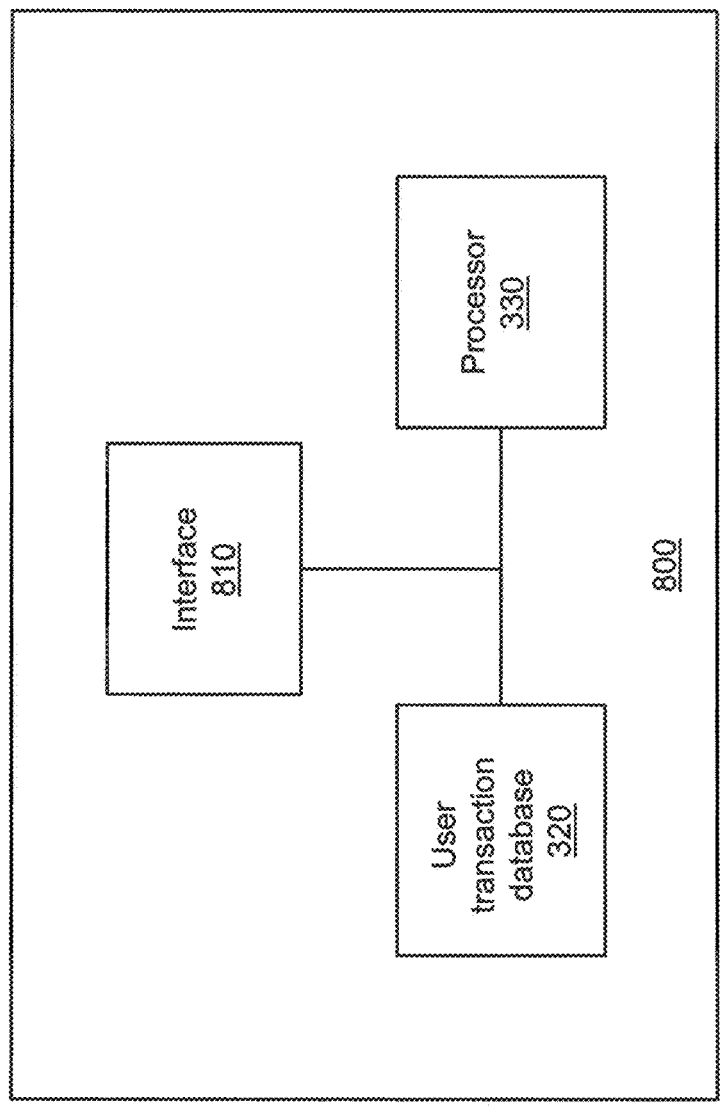
FIG. 8 is diagram illustrating a system of authenticating a user using dynamic information tokens according to an embodiment of the invention.

FIG. 8 is diagram illustrating a system 800 for authenticating a user using dynamic information tokens according to an embodiment of the invention. The system 800 can include an interface 810 that receives a login name from a user and an answer to one or more security questions from the user. The security question(s) can be regarding recent activity performed by the user. As used herein, the term "interface" includes a computer hardware device, such as, for example, a keyboard, a mouse, a microphone, a touchpad, a touchscreen, a joystick, a controller, a camera, a disk drive, an input port, an output port, an antenna, etc.

A user transaction database 820 can be connected to the interface, where the user transaction database 820 can include data associated with the login name of the user. As used herein, the term "connected" includes operationally connected, logically connected, in communication with, physically or wirelessly connected, engaged, coupled, contacts, linked, affixed, and attached. The data in the user transaction database 810 can include social media activity of the user (e.g., comments, posts, shares, photos, new friends added, check-ins, etc.), web browsing activity of the user (e.g., webpages visited), purchase activity of the user (e.g., online or offline (via credit, debit or gift card)), television activity of the user (e.g., channels viewed, shows watched (e.g., streaming, cable, antenna), downloads), music activity of the user (e.g., streaming, antenna, satellite), electronic calendar activity of the user (e.g., meetings, phone calls, events, etc.), electronic mail activity of the user (e.g., sent messages, received messages), instant messaging activity of the user (e.g., sent messages, received messages), text messaging activity of the user (e.g., sent messages, received messages), toll payment activity of the user (e.g., location and amount of toll paid), and/or geolocation information of the user (e.g., longitude and latitude coordinates, city, state, neighborhood, building).

A processor 830 can be connected to the user transaction database 820, where the processor 830 can select the security question(s) and determine whether the answer received from the user matches the data associated with the login name of the user. As used herein, the term "processor" includes a computer hardware device, such as, for example, a central processing unit (CPU), an integrated circuit, or a microprocessor. The processor 830 can also determine an accuracy score for each security question answered by the user based on a comparison of the answers to the security questions received from the user and the correct answers to the security questions (from the data in the user transaction database 820). The processor 830 can rank the security questions based on the accuracy scores and determine whether a state of the user is impaired (e.g., fatigued, distracted). In at least one embodiment, the system can determine that the user is impaired by accessing the user's profile, medical records, and/or accident records. Sensors or cameras can also monitor actions of the user (e.g., facial expression, walking patterns) and can be used to identify impairment.

In at least one embodiment, the processor 830 selects an impaired security question when the cognitive state of the user is impaired, where the impaired security question has an accuracy score below a predetermined threshold to make it easier for the user to be authenticated when he or she is impaired. Impaired security questions and the predetermined threshold can be stored in the database for the particular user.

Figure 9:
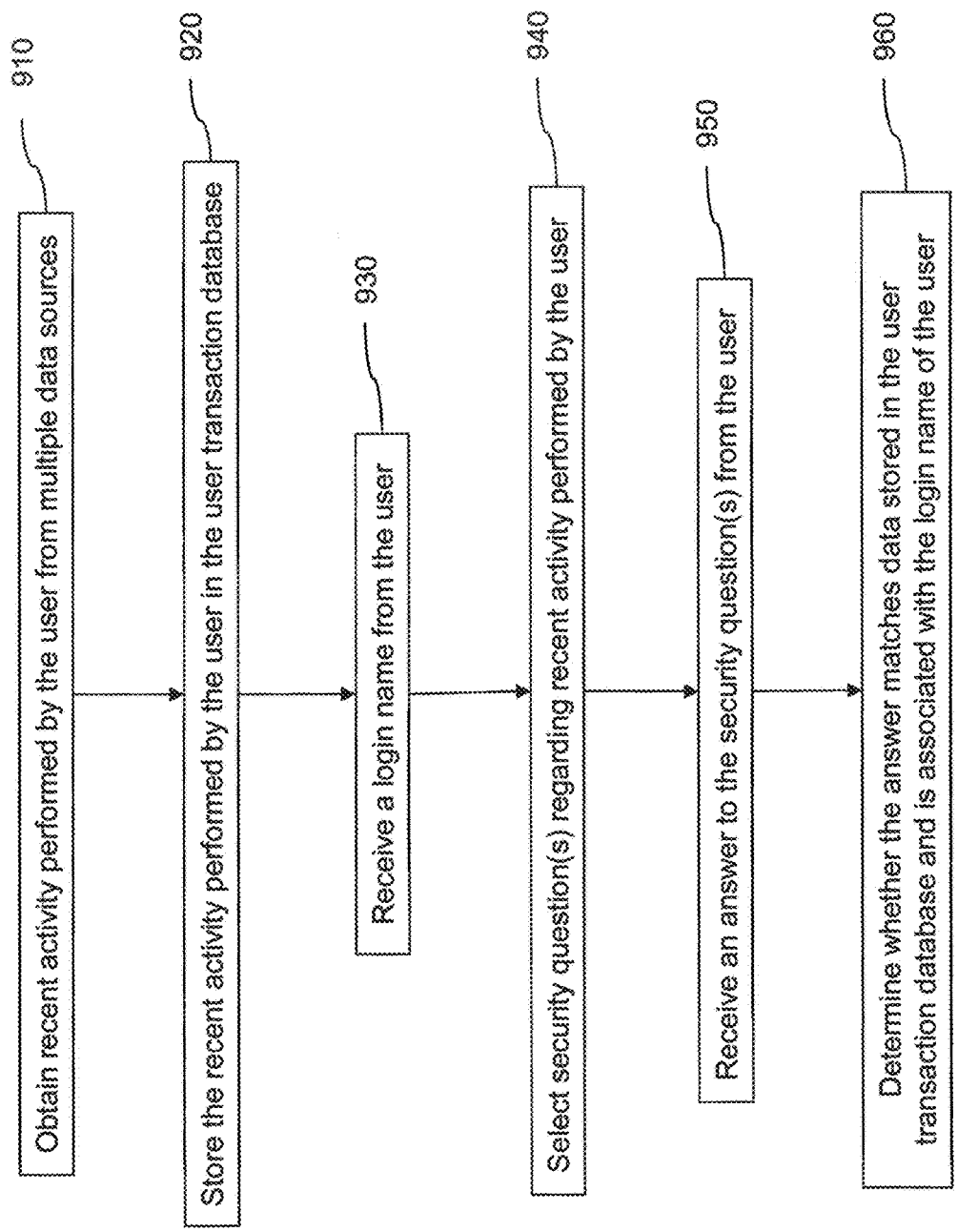
FIG. 9 is a flow diagram illustrating a method of authenticating a user using dynamic information tokens according to an embodiment of the invention.

FIG. 9 is a flow diagram illustrating a method of authenticating a user using dynamic information tokens according to an embodiment of the invention (e.g., using the system 800). A processor can obtain recent activity performed by the user from multiple data sources 910, where the recent activity performed by the user can include social media activity, web browsing activity, purchase activity, television activity, music activity, electronic calendar activity, electronic mail activity, instant messaging activity, text messaging activity, toll payment activity, and/or geolocation information. The data sources can be external to the system (e.g., data providers, merchants, credit card companies, social media websites, telecommunication companies, etc.). The processor can create a user's profile in a user transaction database and store the recent activity performed by the user in the user transaction database 920.

An interface can receive a login name from the user 930; and, the processor can select one or more security questions regarding recent (e.g., previous 24 hours, previous 10 days) activity performed by the user 940. The interface can receive an answer to the security question(s) from the user 950; and, the processor can determine whether the answer matches data stored in the user transaction database and is associated with the login name of the user 960. For example, the processor can select the security question "Whose photograph did you post a comment to on SOCIALMEDIAWEBSITE.COM today?"; the interface can receive an answer from the user (e.g., multiple choice or fill in the blank); and, the processor can query the transaction database and compare the user's answer to the user's stored recent activity on SOCIALMEDIAWEBSITE.COM.

In at least one embodiment, the processor can determine an accuracy score for each security question answered by the user and rank the security questions based on the accuracy scores. The processor can determine whether the state of the user (also referred to herein as the user's "cognitive state" and/or the "user context") is impaired. The state of the user can include the location of the user, a situation of the user (e.g., the user had a telephone call with Dr. Thomas on Tuesday at 3:00 PM), a website on an electronic device of the user, accessibility requirements of the user (e.g., blind, deaf, autistic, etc. (e.g., as determined from a profile of the user)), a distraction level of the user, and a fatigue level of the user. The processor can select an impaired security question when the cognitive state of the user is impaired 992, where the impaired security question can have an accuracy score below a predetermined threshold.

The recent activity performed by the user can include electronic calendar activity of the user, which can include an actual calendar entry and/or a decoy calendar entry. Calendar entries can include events (e.g., meetings, appointments, parties, lunches), tasks, symbols, and "to do's". In at least one embodiment, the processor selects a security question regarding an electronic calendar entry that includes a select individual (e.g., identified by the user/preregistration), and all further security questions include the select individual (can be real or fake person).

In another embodiment, the processor selects a security question regarding an electronic calendar entry that includes a select time of day on a select day of month or a select day of week (e.g., 4:15 PM every 7th day of the month or every Wednesday). The select time of day on the select day of month or the select day of week can be identified by the user (e.g., during a preregistration process). All further security questions can include the select time of day on the select day of month or the select day of week.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 10:
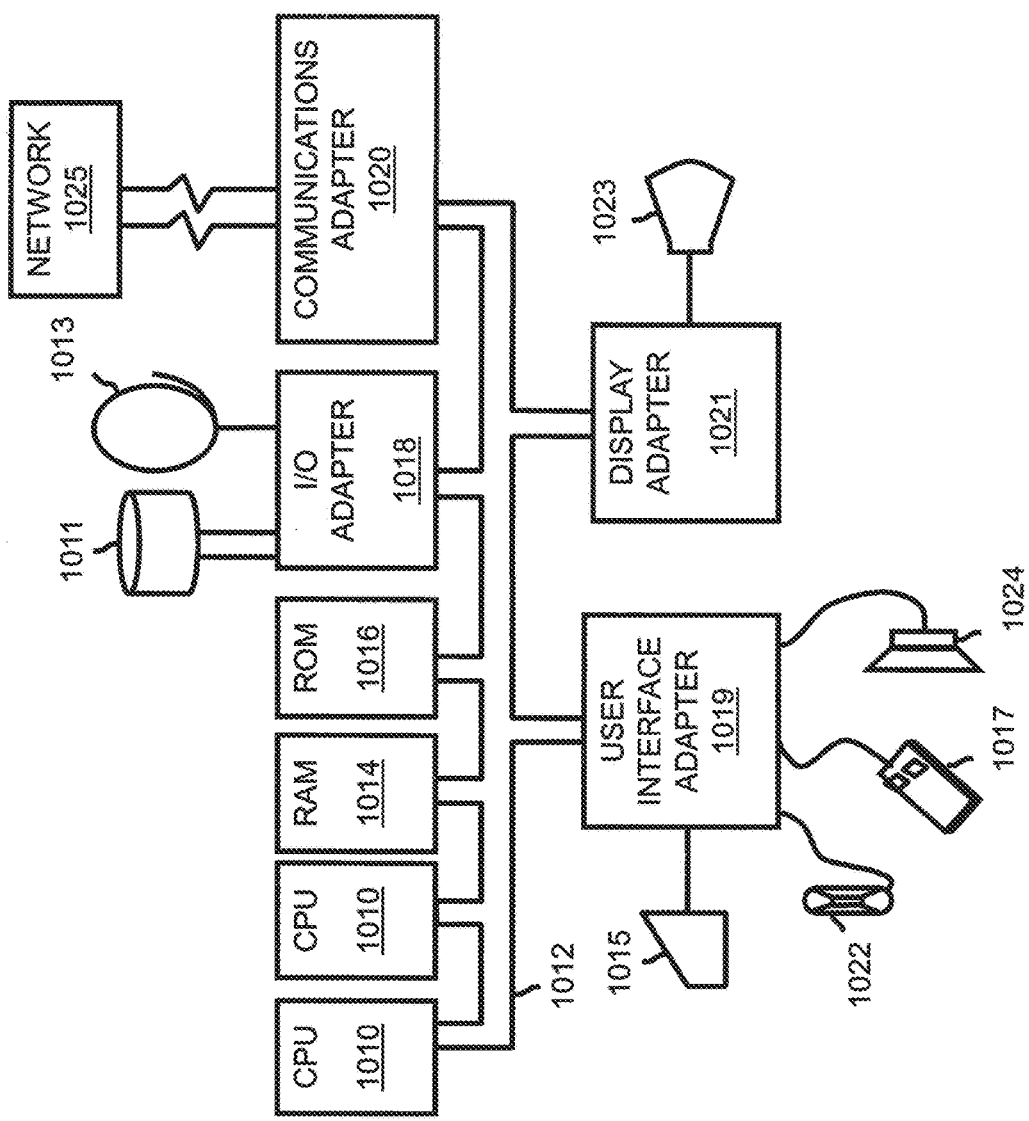
FIG. 10 is a diagram illustrating a computer program product for authenticating a user using dynamic information tokens according to an embodiment of the invention.

Referring now to FIG. 10, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 1010. The CPUs 1010 are interconnected with system bus 1012 to various devices such as a random access memory (RAM) 1014, read-only memory (ROM) 1016, and an input/output (I/O) adapter 1018. The I/O adapter 1018 can connect to peripheral devices, such as disk units 1011 and tape drives 1104, or other program storage devices that are readable by the system. The system can read the inventive instructions on the program storage devices and follow these instructions to execute the methodology of at least one embodiment of the invention. The system further includes a user interface adapter 1014 that connects a keyboard 1015, mouse 1017, speaker 1024, microphone 1022, and/or other user interface devices such as a touch screen device (not shown) to the bus 1012 to gather user input. Additionally, a communication adapter 1020 connects the bus 1012 to a data processing network 1025, and a display adapter 1021 connects the bus 1012 to a display device 1024 which may be embodied as an output device such as a monitor, printer, or transmitter, for example.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
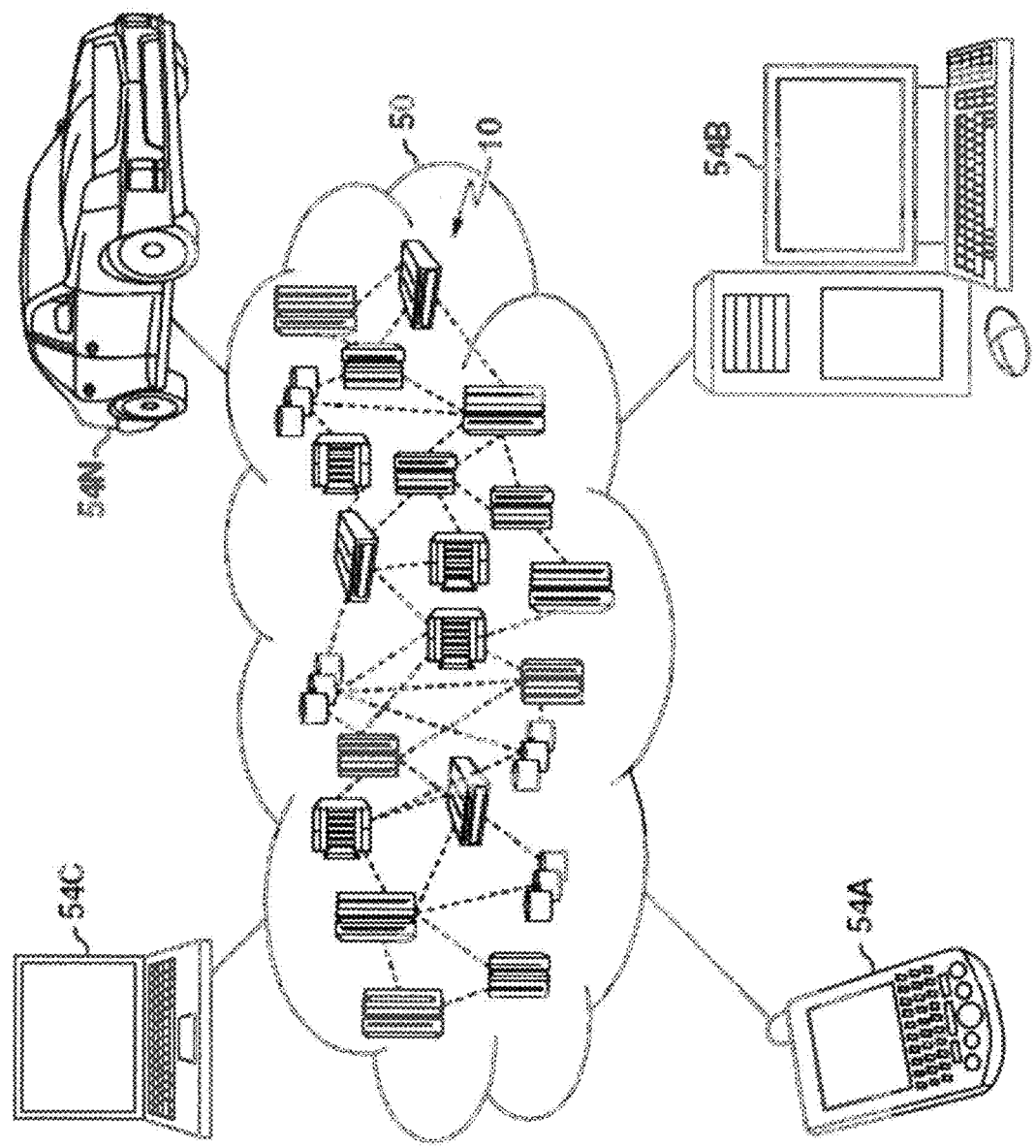
FIG. 11 depicts a cloud computing environment according to an embodiment of the present invention.

Referring now to FIG. 11, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Figure 12:
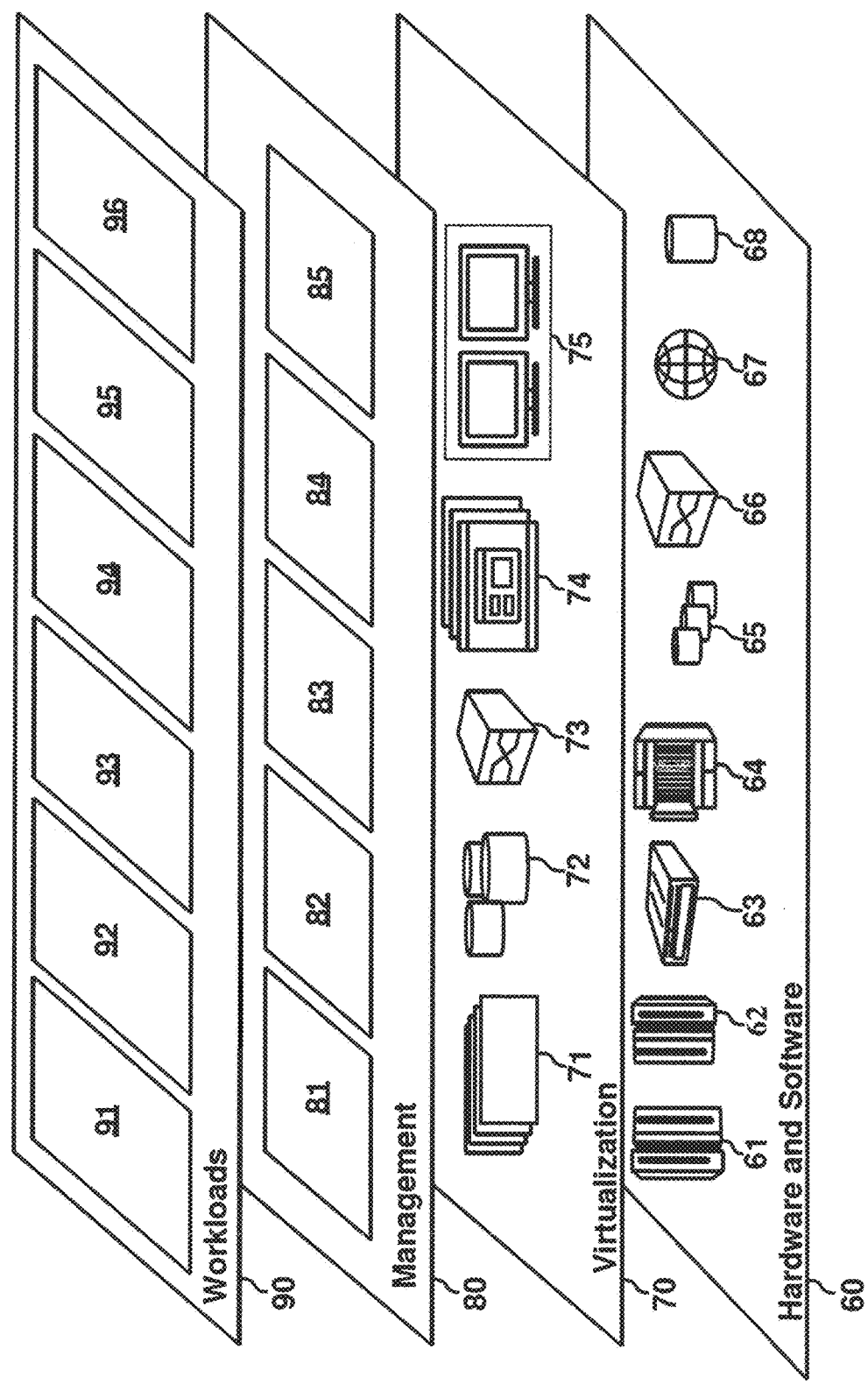
FIG. 12 depicts abstraction model layers according to an embodiment of the present invention.

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and risk-aware multiple factor authentication 96.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of at least one other feature, integer, step, operation, element, component, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   storing in a database security questions and corresponding user response data;
   determining an accuracy score for each of a plurality of security questions previously answered by the user, the accuracy score being based in part on at least one of an amount of queries for a particular security question and a number of correct responses by the user;
   ranking the security questions based on the accuracy scores;
   receiving by an interface a login name from a user;
   determining whether a state of the user is impaired;
   selecting by a processor at least one security question regarding recent activity performed by the user, said selecting of the at least one security question includes selecting at least one impaired security question when a cognitive state of the user is impaired, the impaired security question having an accuracy score below a predetermined threshold;
   receiving by the interface an answer to the at least one security question from the user;
   determining by the processor whether the answer matches data stored in a user transaction database that is associated with the login name of the user.

2. A non-transitory computer-readable medium store computer-readable instruction thereon which when executed by a computer cause the computer to perform a method for authenticating a user using dynamic information tokens, said method comprising:
   storing in a database security questions and corresponding user response data; receiving a login name from a user;
   determining an accuracy score for each of a plurality of security questions previously answered by the user, the accuracy score being based in part on at least one of an amount of queries for a particular security question and a number of correct responses by the user;
   selecting at least one security question based on recent activity performed by the user and the accuracy scores;
   receiving an answer to the at least one security question from the user; and
   determining whether the answer matches data stored in a user transaction database that is associated with the login name of the user.

3. A system comprising:
   a user transaction database storage device configured to store data associated with a login name of the user and security questions and corresponding user response data;; and
   processing circuitry configured to
   receive a login name from a user and an answer to at least one security question from the user; and
   determine an accuracy score for each of a plurality of security questions previously answered by the user, the accuracy score being based in part on at least one of an amount of queries for a particular security question and a number of correct responses by the user;
   select the at least one security question based on recent activity performed by the user and the accuracy scores; and
   determine whether the answer matches the data associated with the login name of the user.

4. The system according to claim 3, wherein said user transaction database includes data selected from the group consisting of:
   social media activity;
   web browsing activity;
   purchase activity;
   television activity;
   music activity;
   electronic calendar activity;
   electronic mail activity;
   instant messaging activity;
   text messaging activity;
   toll payment activity; and
   geolocation information.

5. The system according to claim 3, wherein said processing circuitry:
   ranks the security questions based on the accuracy scores;
   determines whether a cognitive state of the user is impaired; and
   selects an impaired security question when the cognitive state of the user is impaired, the impaired security question having an accuracy score below a predetermined threshold.

6. A method of authenticating a user using dynamic information tokens, said method comprising:
   storing in a database security questions and corresponding user response data;
   obtaining online activity performed by a user from at least one data source;
   storing the online activity performed by the user in a user transaction database;
   receiving by an interface a login name from the user;
   determining an accuracy score for each of a plurality of security questions previously answered by the user, the accuracy score being based in part on at least one of an amount of queries for a particular security question and a number of correct responses by the user;
   selecting by a processor at least one security question based on recent online activity performed by the user and the accuracy scores;
   receiving by the interface an answer to the at least one security question from the user; and
   determining by the processor whether the answer matches data stored in a user transaction database that is associated with the login name of the user.

7. The method according to claim 6, wherein the recent online activity performed by the user is selected from the group consisting of:
   social media activity;
   web browsing activity;
   purchase activity;
   television activity;
   music activity;
   electronic calendar activity;

electronic mail activity;
instant messaging activity;
text messaging activity;
toll payment activity; and
geolocation information.

8. The method according to claim 6, further including:
ranking the security questions based on the accuracy scores;
determining whether a cognitive state of the user is impaired;
selecting an impaired security question when the cognitive state of the user is impaired, the impaired security question having an accuracy score below a predetermined threshold.

9. The method according to claim 6, wherein the state of the user is selected from the group consisting of:
a location of the user,
a situation of the user,
a website on an electronic device of the user,
accessibility requirements of the user,
a distraction level of the user, and
a fatigue level of the user.

10. The method according to claim 6,
wherein the recent online activity performed by the user includes electronic calendar activity, and
wherein the electronic calendar activity includes at least one actual calendar entry and at least one decoy calendar entry.

11. The method according to claim 6,
wherein said selecting of the at least one security question includes selecting a question regarding an electronic calendar entry, the electronic calendar entry including a select time of day on a select day of month or a select day of week, and
wherein all further security questions include the select time of day on the select day of month or the select day of week.

12. A method comprising:
storing in a database security questions and corresponding user response data;
receiving by an interface a login name from a user;
determining an accuracy score for each of a plurality of security questions previously answered by the user, the accuracy score being based in part on at least one of an amount of queries for a particular security question and a number of correct responses by the user;
selecting by a processor at least one security question based on recent activity performed by the user and the accuracy scores;
receiving by the interface an answer to the at least one security question from the user; and
determining by the processor whether the answer matches data stored in a user transaction database and is associated with the login name of the user.

13. The method according to claim 12, wherein the recent activity performed by the user is selected from the group consisting of:
social media activity;
web browsing activity;
purchase activity;
television activity;
music activity;
electronic calendar activity;
electronic mail activity;
instant messaging activity;
text messaging activity;
toll payment activity; and
geolocation information.

14. The method according to claim 12, wherein the recent activity performed by the user includes:
social media activity;
web browsing activity;
purchase activity;
television activity;
music activity;
electronic calendar activity;
electronic mail activity;
instant messaging activity;
text messaging activity;
toll payment activity; and
geolocation information.

15. The method according to claim 12, further including:
ranking the security questions based on the accuracy scores;
determining whether a state of the user is impaired; and
selecting an impaired security question when a cognitive state of the user is impaired, the impaired security question having an accuracy score below a predetermined threshold.

16. The method according to claim 15 wherein the state of the user is selected from the group consisting of:
a location of the user,
a situation of the user,
a website on an electronic device of the user,
accessibility requirements of the user,
a distraction level of the user, and
a fatigue level of the user.

17. The method according to claim 15, wherein the state of the user includes:
a location of the user,
a situation of the user,
a website on an electronic device of the user,
accessibility requirements of the user,
a distraction level of the user, and
a fatigue level of the user.

18. The method of claim 15, wherein the determining whether the state of the user is impaired is determined based on the ranking.

19. The method according to claim 12,
wherein the recent activity performed by the user includes electronic calendar activity, and
wherein the electronic calendar activity includes at least one actual calendar entry and at least one decoy calendar entry.

20. The method of claim 19, wherein the user can make accessible only a predetermined amount of the electronic calendar activity for authentication use.

21. The method of claim 19, further comprising:
generating an electronic calendar entry for authentication by dragging and dropping an image into an electronic calendar.

22. The method according to claim 12,
wherein said selecting of the at least one security question includes selecting a question regarding an electronic calendar entry, the electronic calendar entry including a select time of day on a select day of month or a select day of week, and
wherein all further security questions include the select time of day on the select day of month or the select day of week.

* * * * *